US006901898B1

(12) United States Patent
Oberg et al.

(10) Patent No.: US 6,901,898 B1
(45) Date of Patent: Jun. 7, 2005

(54) VARIABLE RUNNER LENGTH INTAKE MANIFOLD

(75) Inventors: Erik John Oberg, Brighton, MI (US); Teng-Hua Shieh, Ann Arbor, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 10/831,856

(22) Filed: Apr. 26, 2004

(51) Int. Cl.[7] .............................................. F02M 35/10
(52) U.S. Cl. ............................ 123/184.55; 123/184.53
(58) Field of Search ....................... 123/184.53, 184.55

(56) References Cited

U.S. PATENT DOCUMENTS

| 2,835,235 | A | 5/1958 | Gassmann | 123/184.55 |
|---|---|---|---|---|
| 4,619,226 | A | 10/1986 | Ueda et al. | 123/184.55 |
| 4,646,689 | A | 3/1987 | Katsumoto et al. | 123/184.55 |
| 4,765,286 | A | 8/1988 | Lyjak et al. | 123/184.55 |
| 5,740,770 | A | 4/1998 | Morota | 123/184.55 |
| 5,762,036 | A | 6/1998 | Verkleen | 123/184.31 |
| 5,950,587 | A | 9/1999 | Sattler et al. | 123/184.55 |

Primary Examiner—Noah P. Kamen
(74) Attorney, Agent, or Firm—Gifford, Krass, Groh, Sprinkle, Anderson & Citkowski, P.C.

(57) ABSTRACT

The present invention provides a variable runner length intake air manifold operative to optimize the performance of an internal combustion engine over a wide range of engine speeds. The manifold includes a housing formed of upper and lower halves fixedly attached via conventional fastening means. The upper and lower halves define a plurality of runners having constant cross-sectional areas but different cross-sectional shapes. A tapered drum is disposed within the housing and includes one open end and a plurality of openings formed in the outer surface that communicate with corresponding runners of the housing. The tapered drum is rotatably mounted within the housing such that the effective runner length or airflow path of the manifold is made adjustable by varying the angular position of the tapered drum disposed within the housing.

15 Claims, 8 Drawing Sheets

VARIABLE RUNNER LENGTH INTAKE MANIFOLD

FIELD OF THE INVENTION

The present invention relates to a variable runner length intake manifold for an internal combustion engine and more particularly to a runner length that can be adjusted based on engine speed such that the runner length is at all times set to an optimal length.

BACKGROUND OF THE INVENTION

The performance of an engine at wide-open throttle is often judged by the breathing characteristics of induction, intake and exhaust systems. Tuning and ramping effects at mid and high engine speeds assist air motion through the engine's air intake manifold and into engine cylinders. By utilizing the so-called inertia effect of intake gas, the volumetric efficiency of an internal combustion engine can be improved whereby the output power of the engine can be enhanced. The intake inertia effect depends upon the length of the intake passage of the engine and the engine speed. Particularly, as the engine speed is increased, the length of the intake passage at which the inertia effect is maximized becomes short. Thus, there have been proposed intake devices in which the effective length of the intake passage can be varied according to engine speed. However, many conventional intake manifold systems are still based on a fixed runner length. In such case, a manifold designer has to choose a length for the best tradeoff between engine torque and power. With a fixed runner length, the engine performance is only optimized at one RPM.

The present invention provides an air intake manifold that allows for engine performance to be optimized based on engine speed by adjusting the manifold runner lengths to achieve the best tradeoff between engine torque and power at various speeds.

SUMMARY OF THE INVENTION

The present invention provides a variable runner length air intake manifold for an internal combustion engine wherein vehicle performance parameters are optimized over a range of engine speeds, and wherein the flow pattern of the intake air at different runner lengths experiences smooth transition when entering the intake manifold and passing through a rotating interior part such that substantially constant flow resistance is incurred despite the variable runner length.

The inventive variable runner length air intake manifold includes a housing having fixedly attached upper and lower halves. The upper half of the housing includes at least one air intake portion and a plurality of outlets. The plurality of outlets are in fluid communication with a corresponding one of each of the plurality of runners and the air intake valve inlets of the engine.

A tapered drum having opposing ends is disposed within an interior volume of the housing and cooperates with the housing to define a plurality of runners having equivalent cross-sectional areas but differ with respect to cross-sectional height and width. The tapered drum includes an open end for receiving air drawn into the air intake manifold through the air inlet portion formed in the upper half of the housing.

A plurality of sealing ribs are formed on an outer surface of the tapered drum. The sealing ribs are spaced apart between the opposing ends wherein a plurality of aligned openings are formed through the outer surface of the tapered drum between adjacent sealing ribs. Each of the plurality of openings communicates with a corresponding one of the plurality of runners formed by the housing and tapered drum. The air received through the open end of the tapered drum passes through the plurality of openings and a portion of each of the runners depending on the position of the cylinder within the housing. Thereafter, the air passes into the air intake inlets of the engine whereby the distance between the plurality of openings and the air inlets define an effective runner length for each of the individual runner lengths.

The tapered drum is rotatably mounted within the housing and is in communication with a runner length adjuster. The runner length adjuster is operative to rotatably adjust the position of the tapered drum within the housing such that the effective runner length for each of the individual runner lengths is variable. In this manner, a variable runner length air intake manifold for an internal combustion engine is provided that allows for the performance of the internal combustion engine to be optimized over a range of engine speeds.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE INVENTION

The present invention provides a variable runner length air intake manifold that is operative to meet optimum performance levels in power and torque over a range of engine speeds. The invention allows for fast and efficient calibration of performance levels during engine development and evaluation whereby users have flexibility in adjusting the runner length of the air intake manifold such that regulatory requirements are satisfied and performance goals at different engine speeds are readily obtained.

Figure 1:
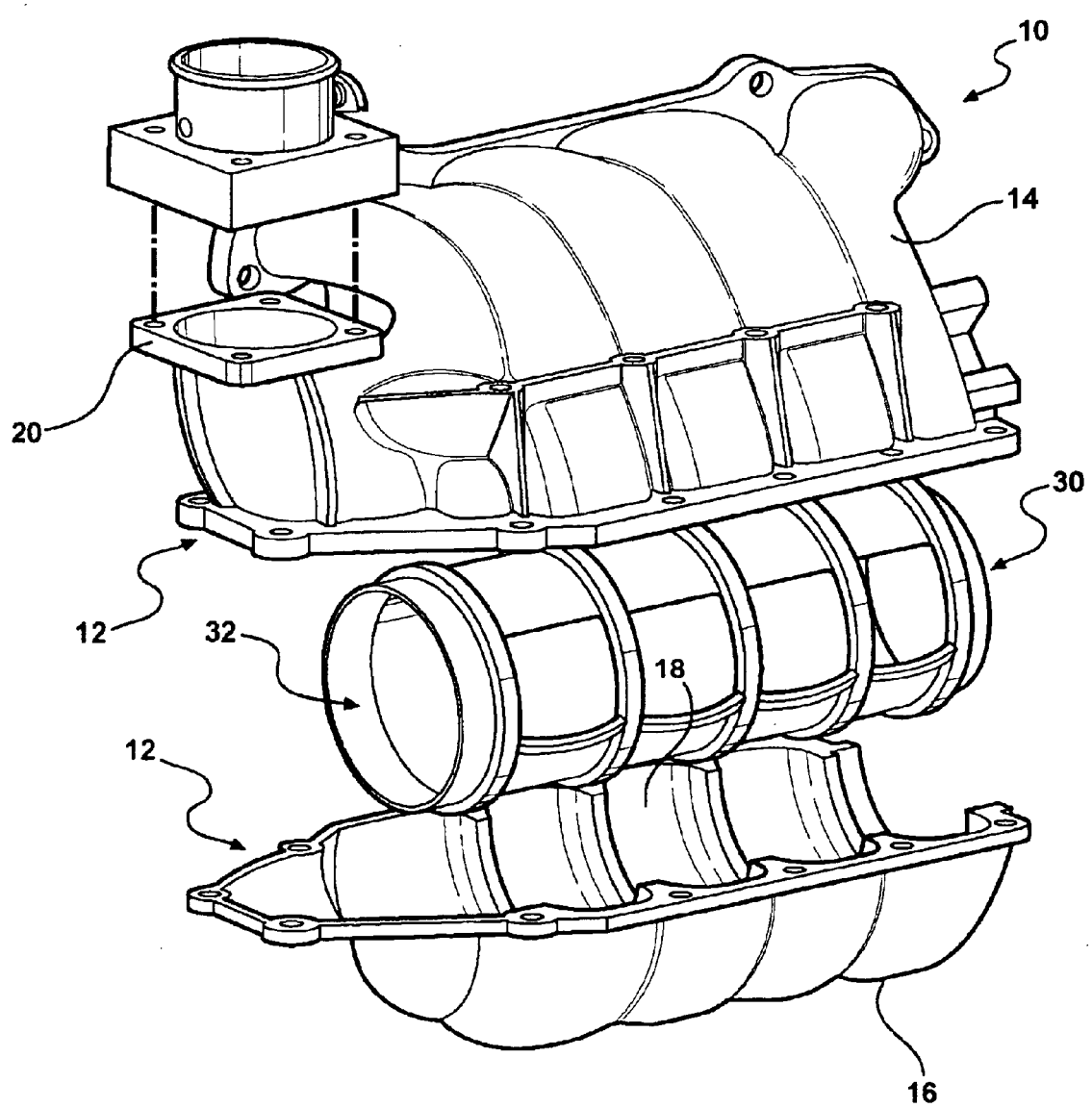
FIG. 1 is a perspective view of a variable runner length air intake manifold in a first exploded view.
Figure 2:
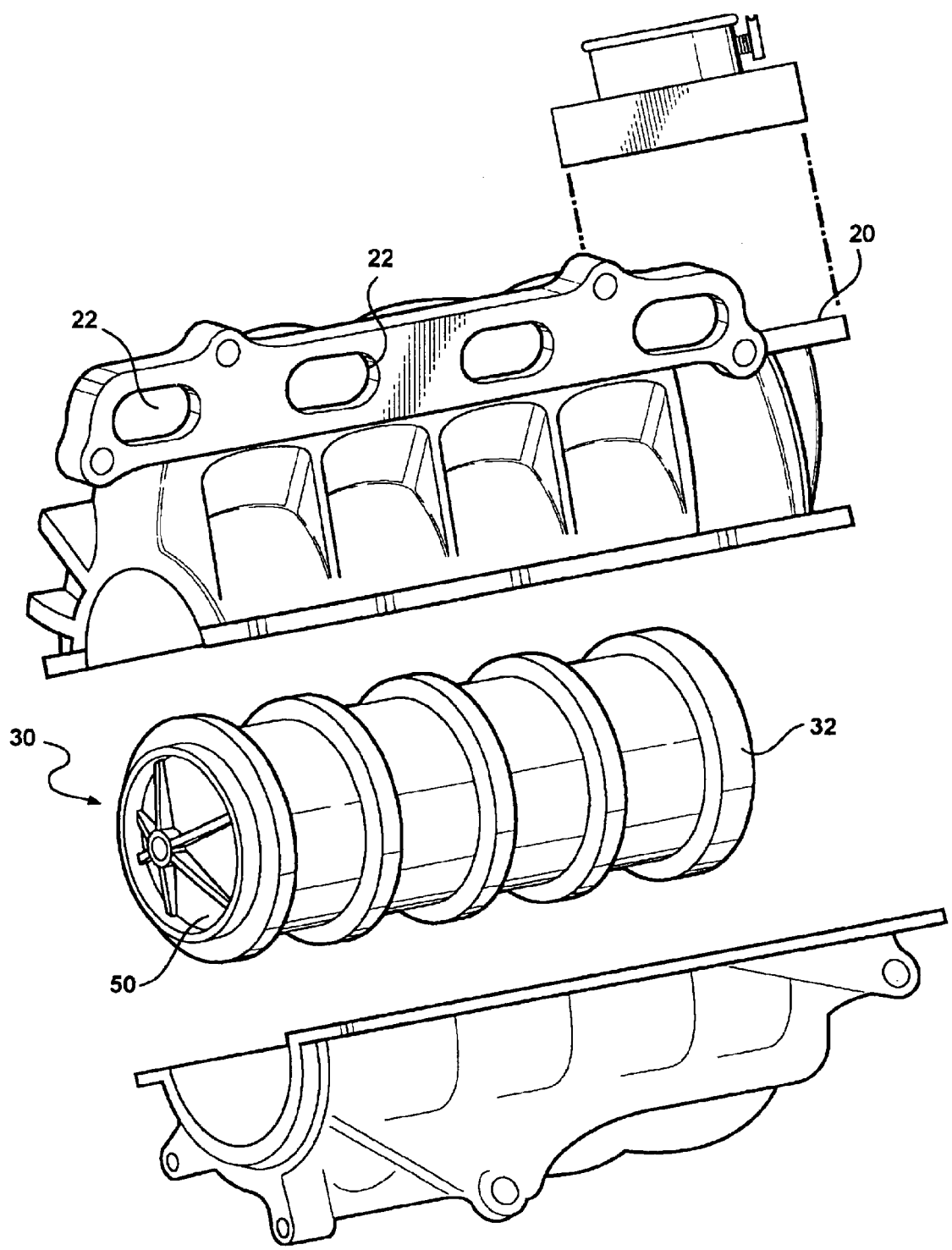
FIG. 2 is a second exploded view of the variable runner length air intake manifold of FIG. 1.

FIGS. 1 and 2 illustrate exploded perspective views of a variable runner length air intake manifold 10 as according to the invention. The air intake manifold 10 includes a housing 12 formed of upper 14 and lower 16 halves operative to be fixedly attached via a conventional fastening means. The manifold housing 12 cooperates with a tapered drum disposed therein to define a plurality of runners 18'–18"" having equivalent cross-sectional areas but different cross-sectional shapes.

Figure 5:
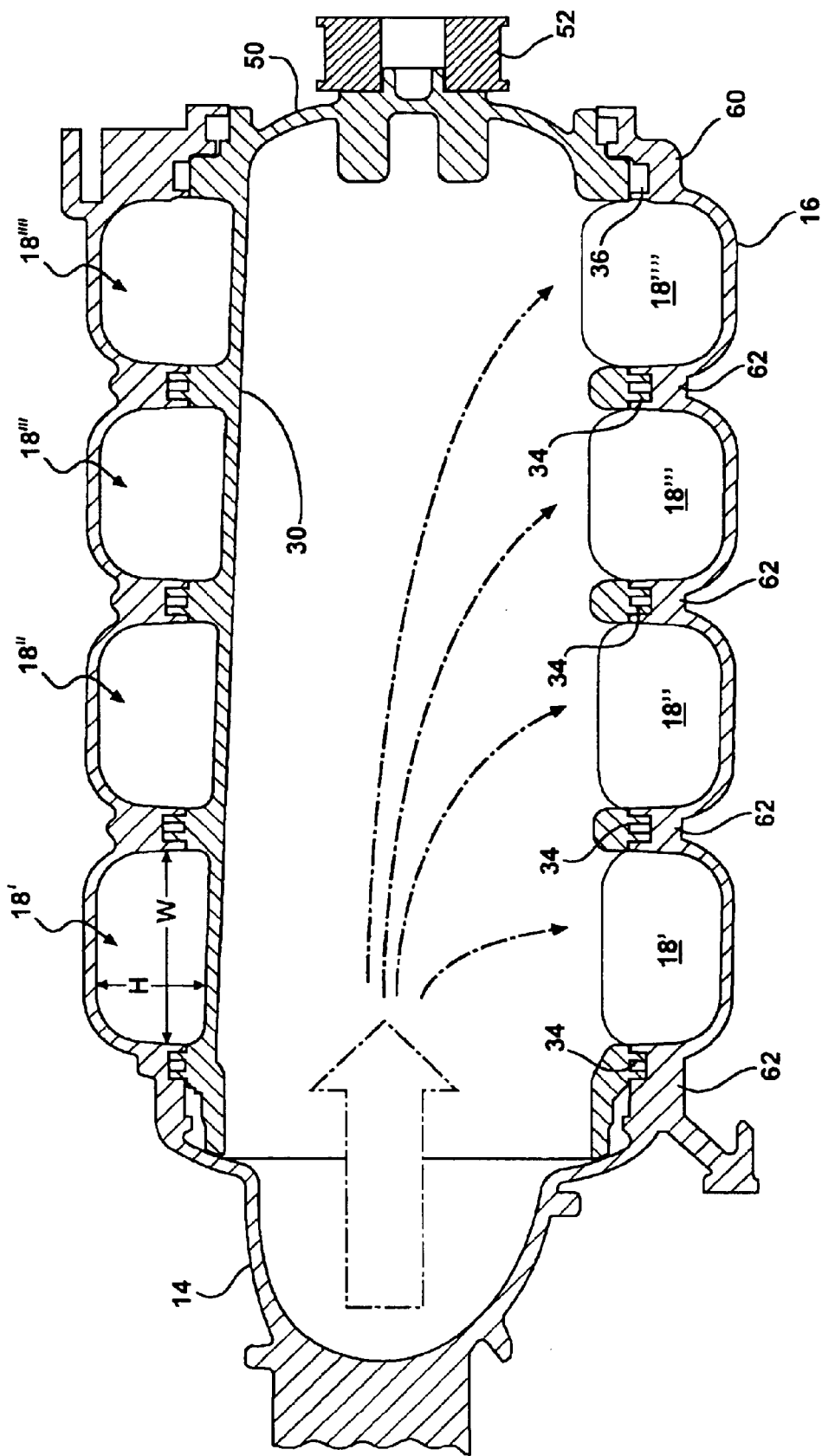
FIG. 5 is a longitudinal cross-sectional view of the variable runner length air intake manifold.

As best illustrated in FIG. 5, the plurality of runners 18'–18"" are generally rectangular in cross-sectional shape wherein each runner has a height H dimension and a width W dimension. With regard to runner 18', a centerline point is determined to be at one-half of the height and width of the runner. A centerline length for each runner is defined as the distance between two centerline points wherein one point corresponds to the beginning of a runner air flow path and another corresponds to the end of the runner air flow path.

Upon closer inspection of FIG. 5, it is illustrated that the width of 18' is larger than the width of 18", 18'" and 18"". In contrast, the height of 18' is less than the height of 18", 18'", and 18"". Each runner has a different cross-sectional shape and centerline length due to the design of the tapered drum. However, the variation in cross-sectional shape operates to minimize the difference in centerline length due to the design of the tapered drum. Illustratively, the difference in centerline lengths of the runners at minimum length, i.e. 353 mm, ranges from 2 mm–6 mm, and at maximum length, i.e. 687 mm, ranges from 5 mm–15 mm. All the runners are equal length at only one pre-selected length, i.e. 455 mm, which allows for peak power and torque output of the engine. Accordingly, the runners provide a substantially consistent cross-sectional area but a substantially different cross-sectional shape.

The upper half 14 of the housing 12 includes an air inlet portion 20 and a plurality of air outlets 22. Each of the air outlets 22 are operative to communicate with air intake valve inlets of an internal combustion engine (not shown).

A tapered drum 30 having opposing ends and a generally cylindrical shape is disposed within the housing 12 and cooperates with the housing 12 to define the plurality of runners. The tapered drum 30 includes an open end 32 for receiving air from the air inlet portion 20 and into an interior volume of the housing 12. The tapered drum 30 is rotatably mounted within the housing 12 such that it may be rotatably displaced about its longitudinal axis.

Preferably, the housing and drum may be formed of an injection moldable material such as plastic or polyethylene. Optionally, the housing and tapered drum is formed of a die castable material such as magnesium, aluminum or other metals suitable for such purpose. The tapered shape of the drum provides advantages with regard to manufacturability in view of the preferred and optional methods of production.

Figure 3A:
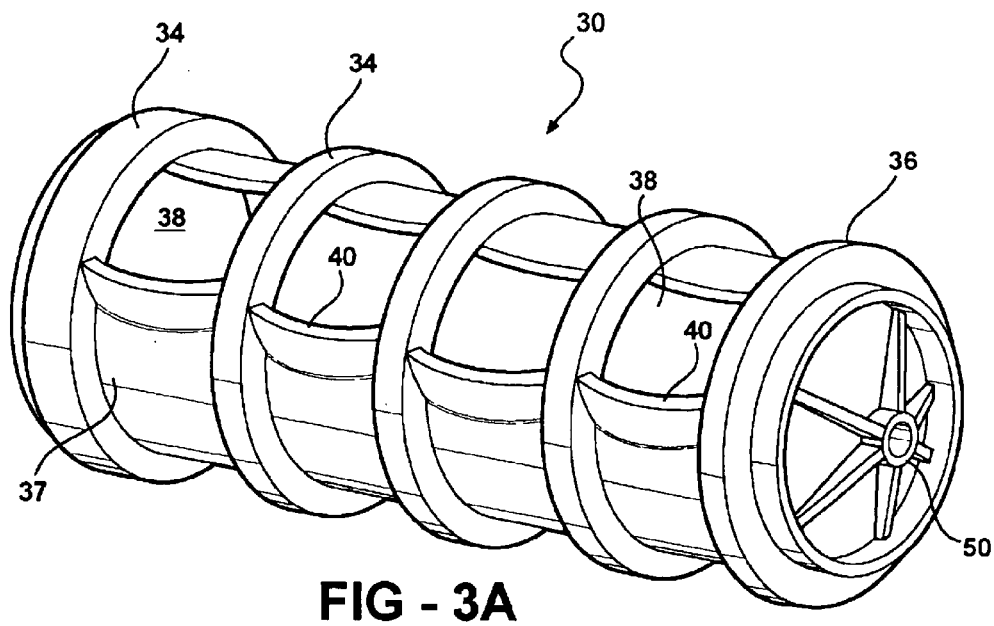
FIGS. 3A and 3B illustrate first and second embodiments of the tapered drum for a surge tank as according to the invention.
Figure 3B:
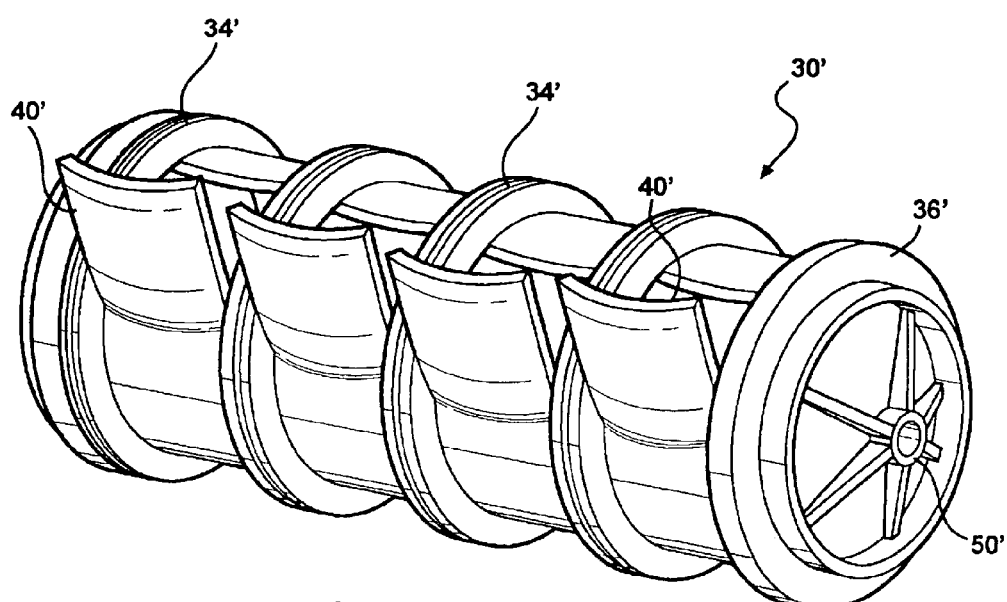

As best illustrated in FIGS. 2–3B, the opposing end 50 of the tapered drum is selectively closed and adapted to cooperate with a drum adjustment means for rotatably adjusting the tapered drum 30 within the housing 12. Optionally, the opposing end 50 is open wherein a portion of the housing 12 operates to shroud the opposing end 50 when disposed within the interior volume of the housing 12 as according to a preferred embodiment to be described hereinafter. The closed configuration of the opposing end 50 is desirable for development purposes because it provides convenience for facilitating the integration of a drum adjustment means.

FIGS. 3A and 3B illustrate first and second alternative embodiments of the tapered drum 30, 30' respectively as according to the invention. As best illustrated in FIG. 3A, a first alternative embodiment of the tapered drum 30 includes a plurality of sealing ribs formed on an outer surface 37 that are spaced apart between the opposing ends 32 and 50. The tapered drum 30 includes a plurality of openings 38 formed through the outer surface 37 which are disposed between adjacent sealing ribs 34 in a substantially aligned fashion between the opposing ends. Each of the openings 38 is in fluid communication with a corresponding one of the runners 18'–18"" defined by the exterior wall of the tapered drum 30 and the housing 12.

Air flowing through the air intake manifold 10 is received through the open end 32 of the tapered drum 30 and out of the plurality of openings 38 formed in the outer surface 37 of the drum and thereafter continues through a portion of each of the runners 18'–18"". The air passes from the plurality of air outlets 22 formed in the upper half 14 of the housing 12 to the air intake inlets of the engine. Hence, the distance from the openings 38 formed in the tapered drum 30 to the air intake inlets defines an effective runner length for each of the runners 18'–18"" of the air intake manifold 10.

Figure 4A:
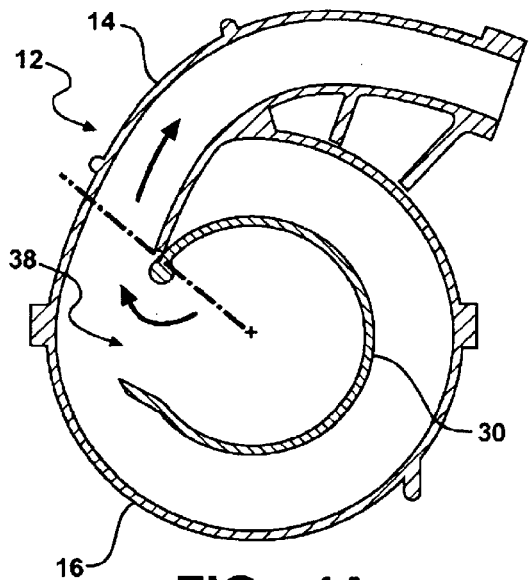
FIGS. 4A–4C illustrate cross-sectional views of the variable runner length air intake manifold of FIG. 3A wherein the angular position of the tapered drum disposed in the housing is varied to adjust the effective runner length.
Figure 4B:
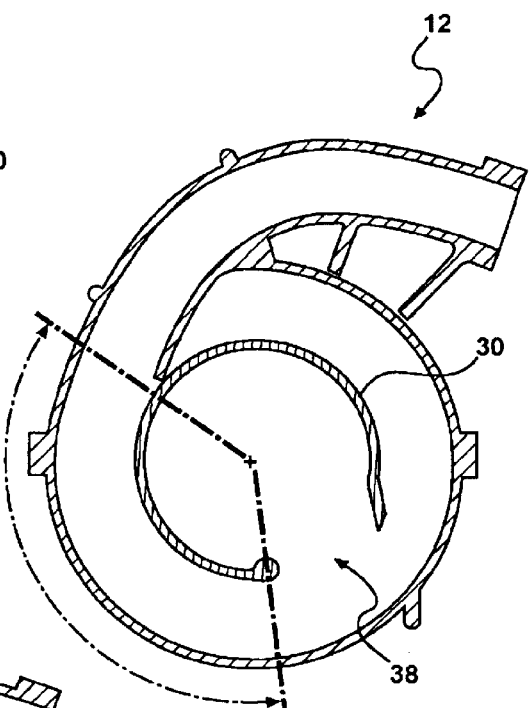
Figure 4C:
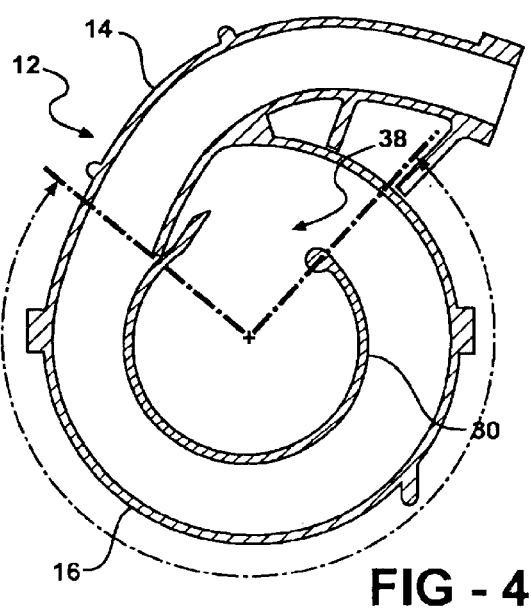

Referring to FIGS. 4A–4C, there are illustrated cross-sectional views of the inventive air intake manifold 10 wherein the tapered drum 30 is positioned within the housing 12 to provide the shortest effective runner length through which intake air passes as best shown in FIG. 4A. FIG. 4C illustrates the tapered drum 30 positioned within the housing 12 that presents a maximum effective runner length while FIG. 4B illustrates a position of the tapered drum 30 within the housing 12 providing an effective runner length approximately midway between the minimum and maximum effective runner lengths illustrated in FIGS. 4A and 4C, respectively.

Under relatively high engine speeds, a relatively short airflow path is desirable, as illustrated in FIG. 4A, to achieve desirable performance levels. In contrast, at relatively low engine speeds a relatively long manifold flow length, as illustrated in FIG. 4C, is desirable in order to achieve optimum performance.

Referring again to FIGS. 3A and 3B, attention is directed to sealing rib 36 which is a contact sealing rib present on both embodiments of the tapered drums 30 and 30'. As such, the sealing rib 36 contacts an interior portion 60 (See FIG. 5) of the housing 12 adjacent the closed end 50 of the tapered drums 30 and 30', respectively. Referring now to FIGS. 3A and 5, each of the remaining sealing ribs of the preferred embodiment of the tapered drum 30 are contact seals 34 which engage contact points 62 of the housing shown in FIG. 5.

Alternatively, as illustrated in FIG. 3B, the remaining sealing ribs of tapered drum 30' are non-contact seals 34' which do not contact the points 62 of the housing 12 as according to the first alternative embodiment of the tapered drum 30. The use of contact-type seals on both sides of all runners provides for zero air leakage. In such case, higher torque-to turn-ratios are realized during engine operation. Alternatively, when non-contact maze-type seals 34' are used for all except the end seal 36' of the second alternative embodiment of the tapered drum 30', a lower torque-to-turn ratio is realized due to only having one contact seal 36'.

Figure 8A:
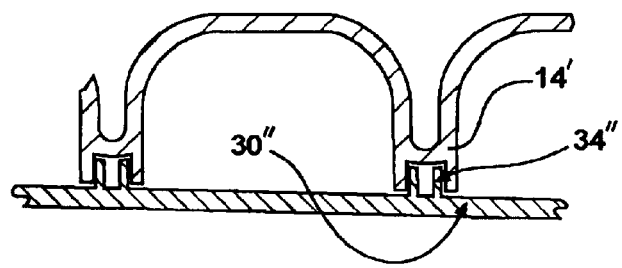
FIGS. 8A–8B illustrate optional embodiments of non-contact seals for use with the preferred embodiment of FIG. 7A.
Figure 8B:
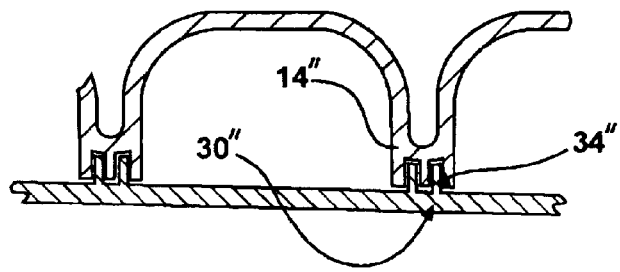

Additionally, as illustrated in FIG. 3B, the tapered drum 30' of the second alternative embodiment includes full-length tongue blocks 40' which block the unused portion of the runners 18'–18"" from air exiting through the openings 38' and into the runners of the housing 12. The full-length tongues 40' are possible because of the maze-type non-contact seals 34' of the tapered drum 30' as best shown in FIGS. 8A–8B. The first alternative embodiment of the tapered drum 30 includes shortened or half length tongues 40 which do not block off the unused portion of the runner length of the housing as according to the alternative embodiment 30'. However, the shortened tongues 40 allow for contact seals 34 to be used within the housing whereby a higher torque-to-turn ratio is realizable relative to the non-contact type seals 34' of the tapered drum 30'.

Figure 7A:
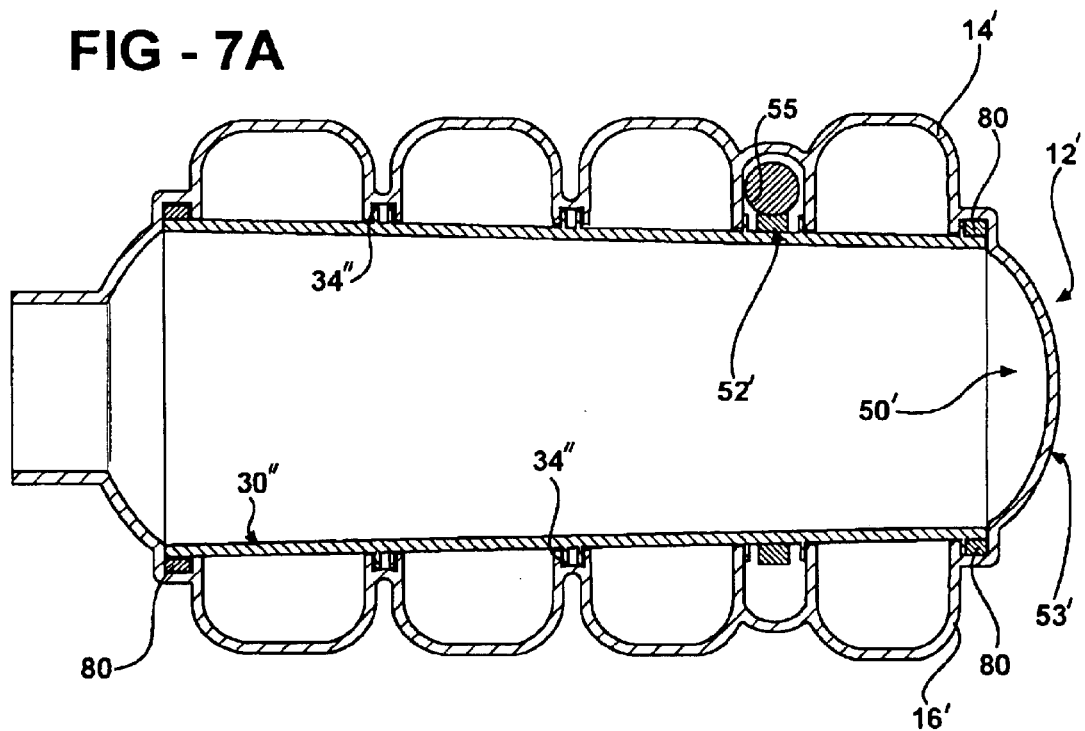
FIGS. 7A–7C illustrate a preferred embodiment of the variable runner length air intake manifold as according to the invention.

A runner length adjuster 52 is provided in communication with the tapered drum 30 disposed in the housing 12. The runner length adjuster 52 is operative to rotatably adjust the position of the tapered drum 30 within the housing 12 such that the effective runner length of each of the runners 18'–18"" is variable as desired. The runner length adjuster 52 may be provided in the form of a belt and pulley system as shown or other means illustratively including a servomotor with gear train assembly and most preferably, a worm gear drive 52' as best illustrated in FIG. 7A. Preferably, the runner length adjuster 52' operates in conjunction with a software programmed microprocessor which controls movement of the tapered drum within the housing 12 with precision accuracy.

Figure 6A:
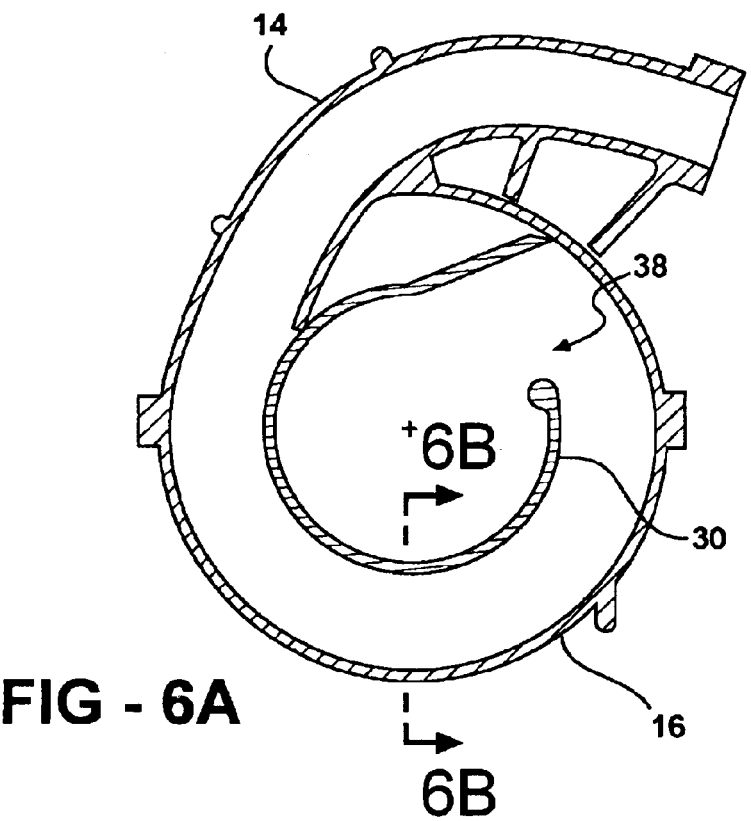
FIGS. 6A and 6B illustrate cross-sectional views of the variable runner length air intake manifold of FIG. 3B having low resistance flow passages and C-type air tight contact seals.
Figure 6B:
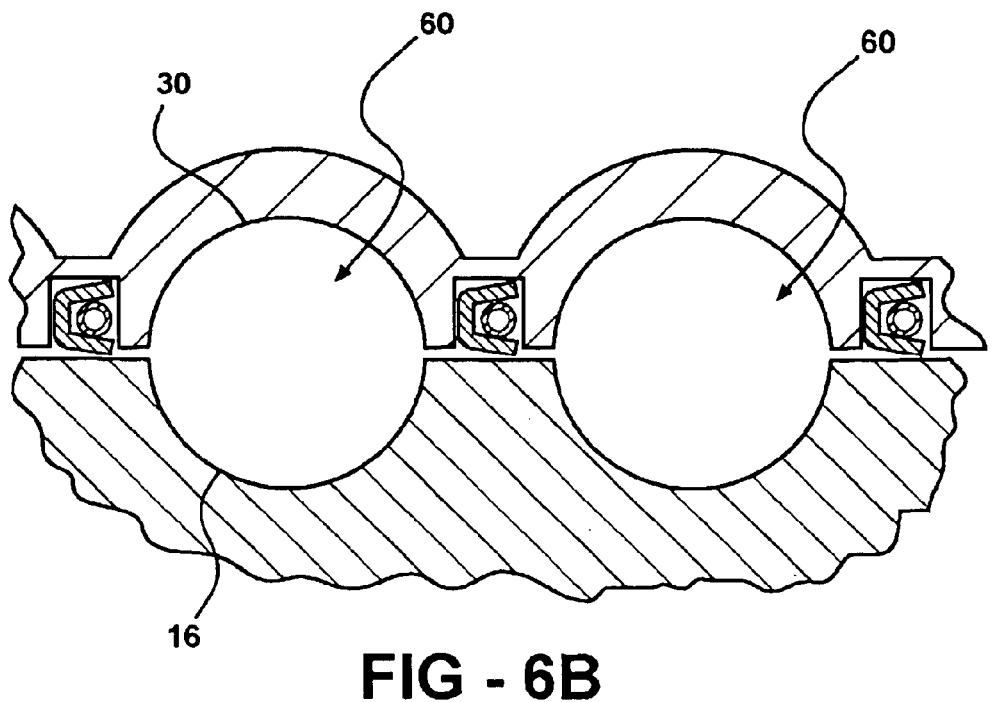
Figure 8C:
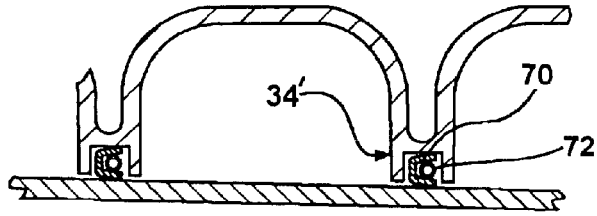
FIG. 8C illustrates an enlarged view of the C-type air tight seals of FIG. 6B.

Referring now to FIGS. 6A and 6B, cross-sectional views of the variable runner length air intake manifold 10 are shown having an airflow path that exhibits a consistently smooth cross sectional flow passage from the openings 38 formed in the tapered drum 30 to the air intake valve inlets at the engine. In this manner, the resistance to airflow through the individual runner lengths is substantially consistent at constant engine speed. FIGS. 6B and 8C illustrate contact type seals between the housing and cylinder wherein a C-shaped sealing material 70 is disposed about a spring 72 within channels formed at contact points between runners. In this manner, an airtight seal is accomplished which is necessary at the sealing rib 36 when the tapered drum 30 is not fully enclosed within the housing at the opposing end 50 as according to the embodiment of FIG 3B. Although it is possible to use contact seals between all runners as illustrated in 6B, such a construction results in higher friction which could compromise engine performance.

Figure 7B:
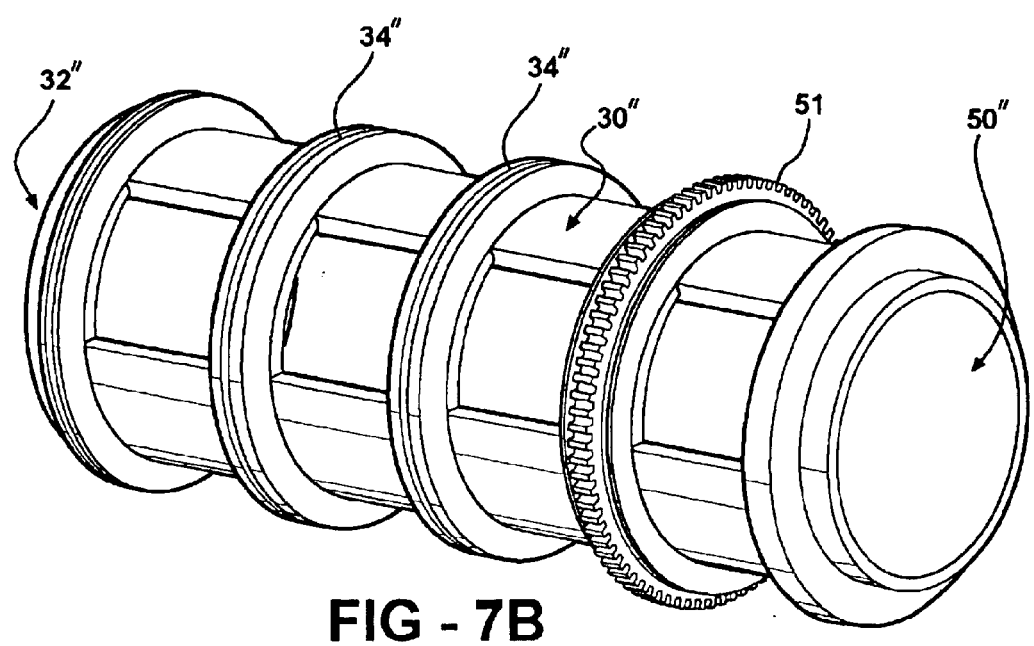
Figure 7C:
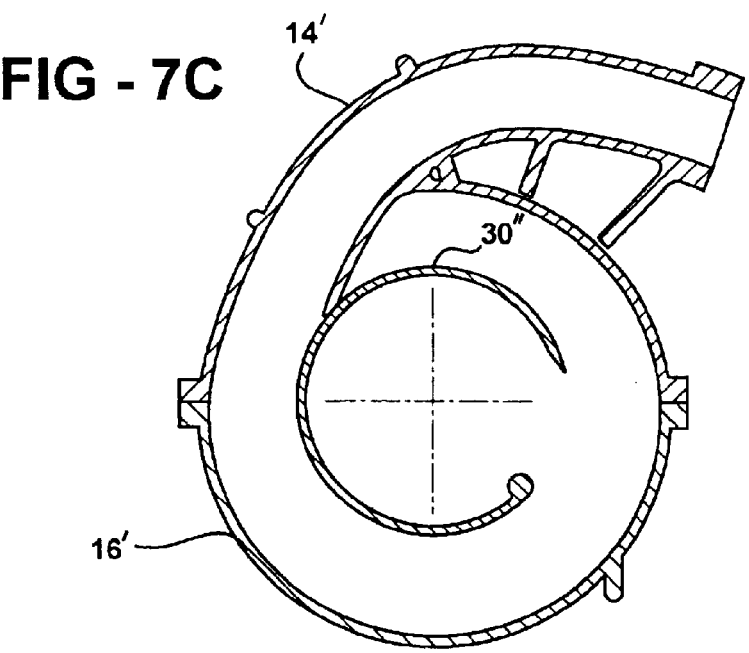

Referring now to FIGS. 7A–7C, a preferred embodiment 10" of the variable air intake manifold as according to the invention. As illustrated, the housing 12' totally enclosed the tapered drum 30" within an interior volume defined by the housing halves 14',16' wherein the opposing end 50' is shrouded by a portion 53' of the housing 12'. Further, the tapered drum 30" is devoid of tongues as according to the first 30 and second 30' alternative embodiments and includes maze type non-contact seals which operate to reduce friction between the tapered drum 30" and housing 12' relative to the contact type seals described above. The tapered drum 30" is suspended within the housing 12' on low friction bushings 80 disposed adjacent the opposing ends 32", 50' of the drum 30". A worm gear assembly 52' is provided as a runner length adjustment means which operate to rotatably maneuver the drum 30" about its longitudinal axis as necessary to allow the runner lengths to be adjusted such that optimum engine performance is realized at varying engine speeds. The drum 30" in this case is disposed with a gear 51 that cooperates with a drive rod 55 as known in the art. Preferably, the runner length adjustment means is in communication with a electronic control device that includes software for maintaining precision control under varying engine speeds.

From the foregoing a variable runner length air intake manifold for an internal combustion engine is provided that allows for an internal cylinder disposed within the manifold housing to be adjusted such that engine performance is optimized over a range of engine speeds. Having described the invention in detail, however, it is appreciated that other embodiments of the variable runner length air intake manifold may become apparent to those skilled in the art in view of the present invention without exceeding the scope of the invention.

We claim:

1. A variable runner length air intake manifold for an internal combustion engine having air intake valve inlets, said manifold comprising:
   a housing having fixedly attached upper and lower halves, said upper half including an air inlet portion and a plurality of air outlets, each of said plurality air outlets in communication with a corresponding one of the air intake valve inlets of said engine;
   a tapered drum having opposing ends disposed within said housing wherein one of said ends is open for receiving air from said air inlet portion and into said housing, said tapered drum operative to cooperate with said housing to form a plurality of runners, said tapered drum being rotatably mounted within said housing;
   a plurality of sealing ribs formed on an outer surface of said tapered drum that are spaced apart between said opposing ends wherein said tapered drum includes a plurality of openings formed through said outer surface and disposed between adjacent sealing ribs wherein each of said plurality of openings is in fluid communication with a corresponding one of said plurality of runners whereby the air received into said manifold passes through said plurality of openings and a portion of each of said runners into said air intake valve inlets of said engine wherein an effective runner length for each of said runners is defined as a distance between a corresponding one of said plurality of openings and corresponding one of said air intake valve inlets; and
   a runner length adjuster in communication with said tapered drum and operative to rotatably adjust the position of said tapered drum within said housing such that said effective runner length for each of said plurality of runners is variable.

2. The intake manifold of claim 1 wherein at least one of said plurality of sealing ribs provides a contact seal.

3. The intake manifold of claim 2 wherein said tapered drum includes half tongues and a remainder of said plurality of sealing ribs provide contact seals.

4. The intake manifold of claim 2 wherein said tapered drum includes full tongues and a remainder of said plurality of sealing ribs provide non-contact seals.

5. The intake manifold of claim 1 formed of a die cast material.

6. The intake manifold of claim 5 wherein said die cast material is magnesium.

7. The intake manifold of claim 1 wherein the runner length adjuster is a servomotor.

8. The intake manifold of claim 1 wherein the runner length adjuster is a worm gear assembly.

9. The intake manifold of claim 1 wherein said runner length adjuster is controlled via a microprocessor.

10. The intake manifold of claim 1 wherein each of said plurality of runner lengths allows for substantially consistent resistance to airflow during length variation.

11. A variable runner length air intake manifold for an internal combustion engine having air intake valve inlets, said manifold comprising:

a housing having fixedly attached upper and lower halves, each of said plurality of runners having an equivalent cross-sectional area wherein each cross-sectional area has a different cross-sectional shape, said upper half including an air inlet portion and a plurality of air outlets, each of said plurality air outlets in communication with a corresponding one of the air intake valve inlets of said engine;

a tapered drum having opposing ends disposed within said housing wherein one of said ends is open for receiving air from said air inlet portion and into said housing, said tapered drum operative to cooperate with said housing to form a plurality of runners, said tapered drum being rotatably mounted within said housing, said tapered drum further including a plurality of openings formed through an outer surface thereof wherein each of said plurality of openings is in fluid communication with a corresponding one of said plurality of runners whereby the air received through said open end passes through said plurality of openings and a portion of each of said runners into said air intake valve inlets of said engine defining an effective runner length for each of said runners; and a runner length adjuster in communication with said tapered drum and operative to rotatably adjust the position of said tapered drum within said housing such that said effective runner length for each of said plurality of runners is variable.

12. A variable runner length air intake manifold for an internal combustion engine having air intake valve inlets, said manifold comprising:

a housing having fixedly attached upper and lower halves that define a plurality of runners, each of said plurality of runners having an equivalent cross-sectional area wherein each cross-sectional area has a different cross-sectional shape, said upper half including an air inlet portion and a plurality of air outlets, each of said plurality air outlets in communication with a corresponding one of the air intake valve inlets of said engine;

a tapered drum having opposing ends disposed within said housing wherein one of said ends is open for receiving air from said air inlet portion and into said housing, said tapered drum being rotatably mounted within said housing;

a plurality of sealing ribs formed on an outer surface of said tapered drum that are spaced apart between said opposing ends wherein said tapered drum includes a plurality of openings formed through said outer surface and disposed between adjacent sealing ribs wherein each of said plurality of openings is in fluid communication with a corresponding one of said plurality of runners whereby the air received through said open end passes through said plurality of openings and a portion of each of said runners into said air intake valve inlets of said engine defining an effective runner length for each of said runners; and a runner length adjuster in communication with said tapered drum and operative to rotatably adjust the position of said tapered drum within said housing such that said effective runner length for each of said plurality of runners is variable.

13. The intake manifold of claim 12 wherein at least one of said plurality of sealing ribs provides a contact seal.

14. The intake manifold of claim 13 wherein a remainder of said plurality of sealing ribs provide contact seals.

15. The intake manifold of claim 13 wherein a remainder of said plurality of sealing ribs provide non-contact seals.

* * * * *